(12) United States Patent
Philbin et al.

(10) Patent No.: US 7,489,940 B2
(45) Date of Patent: Feb. 10, 2009

(54) SYSTEM AND METHOD FOR MANAGING SHORT MESSAGE SERVICE COMMUNICATIONS FOR A RADIO STATION HOSTED EVENT

(75) Inventors: John Joseph Philbin, Chicago, IL (US); Alexander Gates Campbell, Chicago, IL (US); Samuel Thomas Benediktson, Chicago, IL (US); Leon Xiaoliang Zhao, Evanston, IL (US); Vincent Borreros Villaruel, Chicago, IL (US)

(73) Assignee: Phi-Cam, LLC, Chicago, IL (US)

( * ) Notice: Subject to any disclaimer, the term of this patent is extended or adjusted under 35 U.S.C. 154(b) by 593 days.

(21) Appl. No.: 11/127,612

(22) Filed: May 12, 2005

(65) Prior Publication Data
US 2005/0266865 A1    Dec. 1, 2005

Related U.S. Application Data

(60) Provisional application No. 60/571,908, filed on May 17, 2004.

(51) Int. Cl.
*H04Q 7/20* (2006.01)
*G06F 19/00* (2006.01)
(52) U.S. Cl. .................... 455/466; 455/418; 455/417
(58) Field of Classification Search ............. 455/466, 455/418, 517, 575.6, 414.1; 463/42
See application file for complete search history.

(56) References Cited

U.S. PATENT DOCUMENTS

| 6,996,413 | B2 * | 2/2006 | Inselberg ............... 455/517 |
| 7,100,822 | B2 | 9/2006 | Piper et al. |
| 2002/0123359 | A1 | 9/2002 | Wei et al. |
| 2003/0009374 | A1 | 1/2003 | Moodie et al. |
| 2003/0233278 | A1 | 12/2003 | Marshall |
| 2004/0034561 | A1 | 2/2004 | Smith |
| 2004/0083133 | A1 | 4/2004 | Nicholas et al. |
| 2004/0128197 | A1 | 7/2004 | Bam et al. |
| 2004/0268381 | A1 | 12/2004 | Simelius et al. |
| 2005/0125291 | A1 | 6/2005 | Demkiw Grayson et al. |
| 2005/0149385 | A1 | 7/2005 | Trively |
| 2005/0176366 | A1 | 8/2005 | Levy |
| 2005/0289622 | A1 | 12/2005 | Vanlerberghe et al. |
| 2006/0094409 | A1 | 5/2006 | Inselberg |
| 2006/0148448 | A1 | 7/2006 | Turner |
| 2006/0154657 | A1 | 7/2006 | Inselberg |
| 2006/0265284 | A1 | 11/2006 | Moodie et al. |

* cited by examiner

*Primary Examiner*—Melur Ramakrishnaiah
(74) *Attorney, Agent, or Firm*—Edward Bishop (57) ABSTRACT

A system and method for communicating with an audience. The system includes a radio transmitter that transmits a first communication to a plurality of audience members. A server receives a plurality of short message service communications, wherein each of the plurality of short message service communications is transmitted from a portable communication device in reply to the first communication. A display operably coupled to the server automatically displays each of the plurality of short message service communications.

20 Claims, 6 Drawing Sheets

| Song Title | Artist | Vote | Pct |
|---|---|---|---|
| Rumors | Lindsay Lohan | 7 | 64% |
| Scream | Billy Idol | 2 | 18% |
| Rich Girl | Gwen Stefani | 1 | 9% |
| Baby Boy | Beyonce | 1 | 9% |
| Revolution | Judas Priest | 0 | 0% |

+Add Song

| Keyword | Count | Winner |
|---|---|---|
| TOM | 7 | (#70) |
| VEGAS | 4 | 7209362060 |
| TICKETS | 3 | 3125501000 |
| CARTOYS | 2 | 3125501000 |
| BRUCE | 2 | 8479121288 |
| COKE | 1 | (#2) |
| CONCERT | 1 | 7736808800 |
| HOT | 0 | 7032447792 |
| BANANA | 0 | (#20) |

+Add Keyword

Filter Option: ● DJ Messages ○ Hit List ○ Contests ○ All Messages    List Refresh Rate (seconds): 30

| Number | Message | Reply | Time |
|---|---|---|---|
| *Sunday, May 08, 2005* | | | |
| 2532780978 | The travicas like stourt | Thanks for your iRadio message. Keep texting us your requests and shout outs! | 5/8/2005 10:40:44 PM |
| 2532780978 | Hello | Thanks for your iRadio message. Keep texting us your requests and shout outs! | 5/8/2005 10:38:13 PM |
| 2069313802 | Hey ur the best! | Thanks for your iRadio message. Keep texting us your requests and shout outs! | 5/8/2005 8:23:01 PM |
| *Saturday, May 07, 2005* | | | |
| 6513081332 | 6513081332 | Thanks for your iRadio message. Keep texting us your requests and shout outs! | 5/7/2005 11:49:35 PM |
| 4254669027 | i love you nicole | Thanks for your iRadio message. Keep texting us your requests and shout outs! | 5/7/2005 9:38:06 PM |
| *Friday, May 06, 2005* | | | |
| 5092171222 | What up travis | Thanks for your iRadio message. Keep texting us your requests and shout outs! | 5/6/2005 9:51:08 PM |

FIG. 5

ViBES iRadio    DASHBOARD    VOTE    SETUP    STATISTICS    HELP

Station: iRadio Demo    TextLine: 25539

Hit List

| Song Title | Artist | Vote | Pct |
|---|---|---|---|
| Rumors | Lindsay Lohan | 7 | 64% |
| Scream | Billy Idol | 2 | 18% |
| Rich Girl | Gwen Stefani | 1 | 9% |
| Baby Boy | Beyonce | 1 | 9% |
| Revolution | Judas Priest | 0 | 0% |

+Add Song

Contest Summary

| Keyword | Count | Winner |
|---|---|---|
| TOM | 7 | (#70) |
| VEGAS | 4 | 7209362060 |
| TICKETS | 3 | 3125501000 |
| CARTOYS | 2 | 3125501000 |
| BRUCE | 2 | 8479121288 |
| COKE | 1 | (#2) |
| CONCERT | 1 | 7736808800 |
| HOT | 0 | 7032447792 |
| BANANA | 0 | (#20) |

+Add Keyword

Filter Option:  ⦿ DJ Messages    ○ Hit List    ○ Contests    ○ All Messages    List Refresh Rate (seconds): 30

Add a keyword without any space

Keyword: WINNER
Alternative 1: WNNER
Alternative 2:
# of Winners: 100

Submit

SYSTEM AND METHOD FOR MANAGING SHORT MESSAGE SERVICE COMMUNICATIONS FOR A RADIO STATION HOSTED EVENT

CROSS-REFERENCE TO RELATED APPLICATIONS

This application claims the benefit of U.S. Provisional Application Ser. No. 60/571,908, filed on May 17, 2004, which is incorporated herein by reference.

TECHNICAL FIELD

The present invention generally relates to a system and method for managing communications for a radio station hosted event with an audience, and more specifically, to a system and method for managing short message service communications thereto.

BACKGROUND OF THE INVENTION

Various types of systems for communicating and interacting with a remote audience are known in the prior art. Such systems aim to broadcast information from a central point to a plurality of audience members at remote locations, and also aim to allow those audience members to each communicate back to the central broadcast location. In a radio station environment, for example, a disc jockey announces a contest sponsored by the radio station over the air. That announcement is transmitted via the radio station's radio transmitter at a predetermined radio frequency, such as an FM or AM broadcast channel. Each of the audience members receives that broadcast via a radio, which is tuned to the predetermined radio frequency. To communicate back to the central broadcast point, audience members are typically invited to use a telephone to call in to the radio station's switchboard. For example, the ubiquitous statement from a radio station "be caller number X to win free tickets" to some event is known and popular in the prior art.

In responding to the invitation from the central broadcast point, audience members use a telephone to dial a predetermined contact telephone number of the radio station. Because this system relies on existing telephone technology, it has certain inherent disadvantages. For example, the number of audience members who can participate at any given time is limited by the number of telephone connections of the radio station. If the station has only three telephone lines, then only three audience members may participate at any time. Some systems allow for multiple audience members to be connected to a single telephone line, i.e., to be in a standard FIFO queue while waiting for the attention of the human operator of the line which is typically the disc jockey or an assistant. However, such systems are still limited by the number of participants who may wait in the queue. For example, a radio station with four telephone lines, each with a queue of ten positions, still only has a capacity for forty audience members to participate at any given time.

Some broadcast stations allow for audience members to participate via the internet. Typically, that interaction is provided through a website, which allows the user to submit electronic mail to the operators of the central broadcast station. However, that system suffers from the disadvantage of the requirement that the operators of the central station respond to each electronic mail individually. Moreover, that system requires audience members to have access to an electronic mail system at the time the station broadcasts its invitation for communication from audience members. This necessarily limits the number of mobile audience members who can participate.

The present invention is provided to solve the problems discussed above and other problems, and to provide advantages and aspects not provided by prior communication systems of this type. A full discussion of the features and advantages of the present invention is deferred to the following detailed description, which proceeds with reference to the accompanying drawings.

SUMMARY OF THE INVENTION

The present invention is directed to a system and method for communicating with an audience. According to one aspect of the invention, the system involves use of a radio transmitter that transmits or broadcasts a first communication to a plurality of listening audience members. This first communication can be, for example, either a recorded message played by a radio station or a live announcement by an individual, such as a radio personality. One or more members of the listening audience can respond to the first communication by sending a second or responding communication, in the form of a short message service (SMS) communication, in response to the first communication. The short message service communication from each responding audience member can be transmitted from a portable communication device, such as a cellular phone or other similar portable communication device. The system includes a server (e.g., a computer) that receives the short message service communications and a display operably coupled to the server that automatically displays each of the short message service communications received.

According to one aspect of the invention, the first communication is a request for participation in a contest, and each of the short message service communications is an entry into the contest. Each short message service communication may be a text message response, sent by a cellular telephone or other portable communication device capable of sending text messages. The messages are sent over communication networks.

According to another aspect of the invention, the server assigns a number to at least one of the short message service communications. The assigned number can be based on the order in which the short message service communication is received. The server may also be configured to send a third communication to one or more of the portable communication devices. The third communication can be in reply to the short message service communication, and can be generated in response to the number assigned to the short message service communication. The third communication may be a SMS communication, a voice communication, or any other communication suitable for transmitting a response to the listening audience.

The present invention provides a system and method for managing SMS communications wherein a central broadcast station is not limited in the number of audience members who can participate in the communication. The present invention also provides a system and method for communicating with an audience where personnel at the central broadcast station need not respond manually to each individual communication from audience members.

Additionally, the present invention provides a system and method for managing SMS communications received from an audience where reply communications (i.e., communications from members of the audience responding to the broadcast) are automatically generated. Moreover, the reply communication to a responding communication can be generated based on the order in which the responding communication is received.

According to yet another aspect of the invention, a computer readable storage medium adapted to control a computer and including a computer program for managing SMS communications transmitted from a plurality of portable communication devices is provided. The computer program comprises a first code segment for configuring a computer to receive a plurality of responding communications, wherein each of the plurality of responding communications is transmitted from a portable communication device in response to a broadcast communication; and, a second code segment for generating a graphical user interface image, wherein at least a portion of the graphical user interface image is adapted to display each of the plurality of responding communications.

The computer program can further include a code segment for generating statistical data based on the plurality of responding communications and plotting the statistical data on at least a portion of the graphical user interface image. The statistical data can correspond to the relative number of the plurality of responding communications received from each of a plurality of service providers or portable communication devices. According to one alternative, the statistical data can correspond to a relative time interval between receipt of responding communications. The program can configure the computer to update the statistical data in real time.

The program can further include a code segment for generating statistical data based on the geographic location of the responding parties. For example, the area code of the communication device from which responding communications are received can be used to generate statistical data about the user body based on the geographic locations of the users.

The program can further comprise a code segment for configuring the computer to transmit a reply communication to at least one portable communication device in reply to the responding communication received from the at least one portable communication device. The reply can be one of plurality of messages stored in a database.

Additionally, the computer program can further comprise a code segment for configuring the computer to identify a parameter of each of the plurality of responding communications, and to automatically determine whether the parameter of each of the plurality of responding communications indicates one of a win and a loss. The parameter can be, for example, the order or time of receipt of the responding communication.

Similarly, the responding communication can include a parameter identifying a user selection, such as a user-requested artist or song. That parameter can be used to generate statistical data, such as the most-requested artist or most-requested song. Likewise, that data can be correlated to the time at which users transmit responding communications, and the geographic regions from which user transmit those communications. The resultant statistical display can therefore display not only aggregate data concerning the responding communications, but also correlating data regarding the demographics of the users sending those communications.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIGS. 4-6 are screen capture images of a graphical user interface for managing communications between a radio station and an audience in accordance with the principles of the present invention; the figures illustrate the graphical user interface from the perspective of a user at the radio station.

DETAILED DESCRIPTION

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspects of the invention to the embodiments illustrated.

Figure 1:
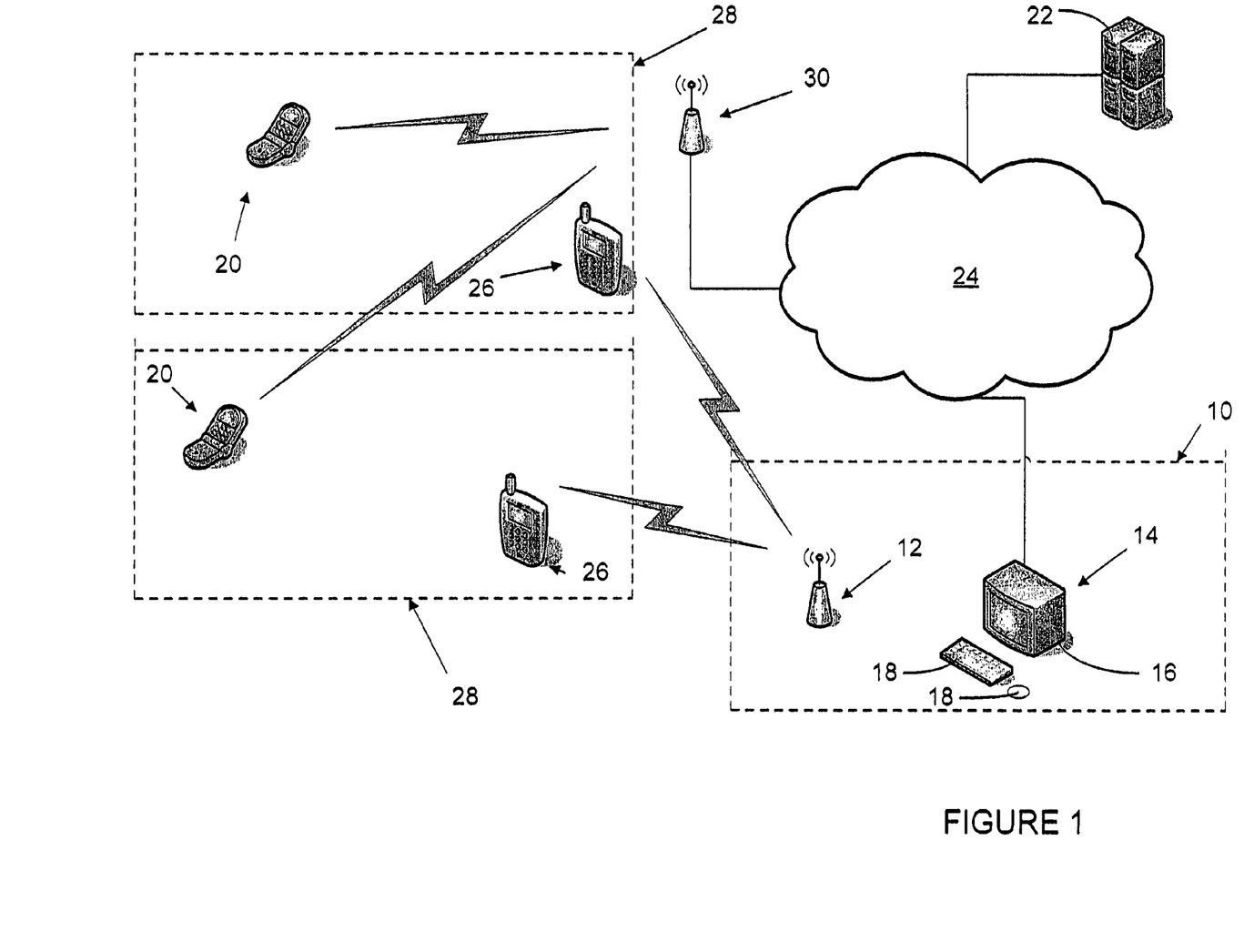
FIG. 1 is a block diagram of a system and method for communicating with an audience, configured in accordance with the principles of the present invention.

Referring initially to FIG. 1, a system and method for managing communications between a radio station and an audience is disclosed. The system includes a radio transmitter 12 that transmits a first communication to an audience. It will be understood by one of skill in the art that in the preferred embodiment, radio transmitter 12 is a standard radio broadcast system comprising a transmitting tower operating at a predetermined radio frequency, such as that used by radio stations licensed to operated by the Federal Communications Commission. However, satellite or digital radio transmissions are also contemplated as being part of the system or method. In another embodiment, the first communication is transmitted via the internet through a "streaming" data application, as will also be appreciated by one of skill in the art, in, for example, an "internet radio" environment.

Preferably, the first communication is widely broadcast and is transmitted to a plurality of radios 26. The radios 26 may be of a variety of different types, including a standard home receiver appliance, a car radio, a portable battery-powered radio, or a broadcast radio system. In another embodiment, the first communication is received through an application configured to access a data stream via the internet (e.g., a computer).

This first broadcast communication can be in the form of a request for participation in a contest. Preferably, the request constitutes an invitation to the audience members to communicate to the central broadcast station and thereby enter the contest.

In response to the first communication, a plurality of audience members can transmit a second or responding communication back to the radio station. Although it is anticipated that a large number of audience members participate by sending a responding communication, each response is referred to herein as "a short message service communication."

According to the present invention, the short message service communications are received by a server 22 over a communication network either directly or in combination with the internet or other network utilized by the radio station transmitting the first communication. Such networks are known and well established.

In this example, the short message service communications are each an entry into the contest. For example, the first communication may be a radio broadcast inviting audience members to enter a contest, such as "Be respondent number X to win free tickets to a concert." Each of the short message service communications is transmitted in response to the first invitation communication, and thereby constitutes an entry into the contest.

Each of the plurality of short message service communications is transmitted from a portable communication device 20. The portable communication device 20 is, in a preferred embodiment, a cellular telephone. However, it will be understood that any portable communication device 20 capable of responding to the first communication in text format is capable of interaction with the system in accordance with the principles of the present invention. For example, the portable communication device 20 may be a personal digital assistant, such as that available through cellular service carriers. The portable communication device 20 is portable, mobile, and configured for interaction and communication with a cellular communication network.

It will be further understood that the portable communication device 20 of the present invention is not limited to text-messages. It is contemplated that the portable communication device 20 also be a communication device configured to transmit media, as well as communications in text format. For example, MMS protocol may be used to allow the transmissions from the portable communication device 20 to include text, and in addition, formatting information regarding the text, additional meta-information regarding the communication, and additional data such as images, sounds and other media.

According to one embodiment of the present invention, each of the plurality of short message service communications is preferably a text message using known short message service text messaging protocols. As will be understood by one of skill in the art, SMS or short message service is a globally accepted wireless service that enables the transmission of alphanumeric messages between mobile subscribers and external systems such as electronic mail, paging and voice mail systems. It will also be understood by one of skill in the art that a text message is an alphanumeric communication constituting characters that are recognizable to a reader of the text message. Preferably, the text message embodied in the short message service communication is of a predetermined nature. For example, the first communication may be "Be the tenth person to text message the word 'win', to win free concert tickets." In response to this message, the short message service communication is a text message comprised of the alphanumeric message "win". It will be understood, however, that to constitute an entry into the contest, the short message service communication need not be comprised of a predetermined alphanumeric pattern.

The short message service communications are transmitted to a predetermined address. This may be a telephone number configured to receive text message communications. Alternatively, the address may also be an electronic mail address configured for the same. To facilitate receipt of the responding messages (i.e., short message service communications), the first communication also preferably comprises information identifying the predetermined address to which the plurality of short message service communications should be addressed. In an alternative form of the invention, a plurality of different addresses may be communicated in the first communication wherein each address can be a different form of entry (e.g., each different address may represent a vote for a specific item or person in a listener survey or poll, or each address may represent a particular reward or prize desired by the responding party).

The server 22 is programmed or configured to receive the short message service communications. As illustrated in FIG. 1, the server 22 is in communication with a transceiver 30, which effects the receipt of the plurality of short message service communications. The transceiver 30 is preferably a component of a cellular telephone network, which receives the short message service communication and transmits the short message service communication to the server 22. The server 22 and transceiver 30 are connected via a communications network 24. Preferably, the communications network 24 is the internet, although a local computer network and local transceiver 30 are also operable in accordance with the principles of the present invention.

The server 22 is also programmed or configured to identify a parameter of the short message service communications, and to assign or associate a unique number to at least one of the short message service communications, and preferably to each of the received short message service communications, based on the identified parameter. The unique number is preferably related to the order or time in which the at least one short message service communication is received by the server 22. For example, a "first" short message service communication received at 11:01:56 pm may be assigned number "1" indicating that this short message service communication is the first one received by the server 22. A "second" short message service communication received at 11:02:04 pm may be assigned number "2" indicating that this short message service communication is the second one received by the server 22. It will be understood that the number assigned to the short message service communication is not necessarily an integer, but may be any data element indicating the order in which the short message service communication is received, such as a timestamp, a letter, or a data tag. Any data capable of representing the order in which the short message service communication is received is operable as a "number" in accordance with the present invention.

In the case where the event identified by the first communication is a contest requiring a response from a particular responding member of the audience (e.g., the tenth caller), the server 22 can automatically determine, based on the parameter (either directly or indirectly by the unique number) of the short message service communication whether that short message service communication is a "win" or a "loss."

Referring to FIG. 4, a graphical user interface 400 is illustrated for a system embodying the principles of the present invention, shown from the perspective of a user at a radio station. Received short message service communications 410, and the personal communication device phone numbers 420 from which those communications 410 have been received, are each time-stamped 430 to determine the order in which they are received. A third communication 440, i.e., a reply communication, is automatically transmitted to each of the personal communication devices. As illustrated, the third communication 440, i.e. the reply communication, comprises the same message for each such communication. And since the third communication 440 can be automatically transmitted, the user of the system at the radio station need not individually reply to each and every short message communication 410. Also illustrated in FIG. 4 is an element 450 of the present invention for tabulating and displaying the aggregate results 460 of short message communications 410 received from audience members. As illustrated, audience members can, in their short message communications 410, vote for a particular artist or song 470. The aggregate results 460 of those votes are then displayed as part of the graphical user interface 400 for the user at the radio station, thereby enabling the user to perform an at-a-glance assessment of the audience input. It will be understood that FIG. 4 is merely an exemplary embodiment of a graphical user interface for use in the system, and that other graphical user interfaces may be used without departing from the principles of the present invention.

It will be understood that the server 22 can be either local to the central broadcast station 10, or remote from the station as illustrated in FIG. 1, such as would be the case in an embodiment wherein the server 22 is operated as a component of an external cellular communication network. Alternatively, the server 22 may be local to the central broadcast station 10, such as would be the case in an embodiment wherein the server 22 is operated by the personnel of the central broadcast station 10, and not part of the external cellular communication network. In either of those embodiments, the server 22 communicates with the transceiver 30 and central broadcast station 10 via the communication network 24. It will be further understood that a wide variety of computer software, operating systems and computer hardware components can be used to configure the server 22 for use with the system and method of the present invention.

A display 14 is operably coupled to the server 22, as illustrated in FIG. 1. In one embodiment, the display 14 is directly connected to the server 22. The display 14 is preferably a standard computer display unit, such as a cathode ray tube monitor 16, a liquid crystal display monitor, and the like. Each of the plurality of short message service communications is automatically displayed by the display 14, thereby eliminating the necessity for audience members to wait until their short message service communications are received by the transmitter of the first communication.

The server 22 can also be configured for transmitting a third communication to at least one of the plurality of portable communication devices providing short message service communications. The third communication may be configured manually by the transmitter of the first communication. This may be done in an embodiment where the transmitting party employs input devices 18 such as a keyboard and mouse to type the contents of the third communication and then transmit that third communication to the portable communication device 20 from which the short message service communication was transmitted. For example, the short message service communication may constitute a text message to the effect of "Please play 'Baby One More Time' by Britney Spears". The third communication may then be manually entered via input devices 18, to the effect of "It will be played at 10 pm", and may then be transmitted to the portable communication device 20 from which the short message service communication was transmitted.

Similarly and as illustrated in FIG. 4, the server 22 can be configured to tabulate user input that is not based on the order or time at which the second communications are received. For example, the first communication can request that users submit, as the second communication, their favorite song or artist. The number of users responding with a particular song or artist are then tabulated, and the most popular (and least popular) song or artist can then be determined based on the results of the aggregate second communication data.

Figure 2:
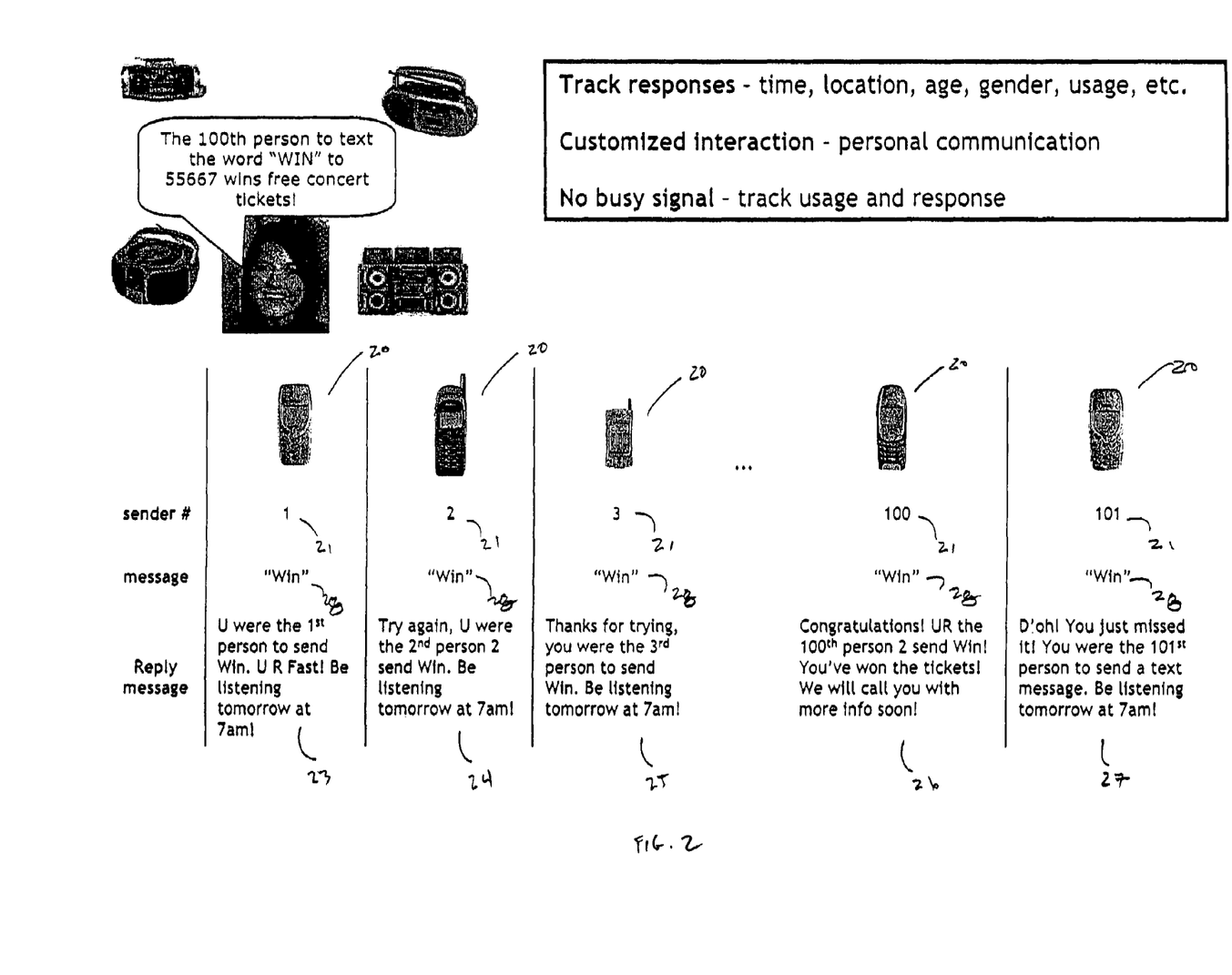
FIG. 2 is a diagram illustrating communications automatically generated in reply to communications from audience members, in accordance with one aspect of the present invention.

In another embodiment and as illustrated in FIG. 2, the third communication is in response to the short message service communication, and is automatically generated by the system based on the order in which the short message service communication is received.

The portable communication devices 20 are each used to transmit a short message service communication 28 to the central broadcast station 10. As disclosed previously herein and as illustrated in FIG. 2, the short message service communications may be of a predetermined alphanumeric text message such as "Win". Preferably, server 22 is configured to generate reply messages (i.e., third communications) 23, 24, 25, 26 and 27 to the respective portable communication device 20 from which the short message service communications 28 originated. These reply messages 23, 24, 25, 26 and 27 are preferably generated automatically by the server 22, but may also be generated manually using input devices 18 by an operator at the central broadcast station 10. The reply messages can be based on the order in which the short message service communication is received by the server 22. For example, third communication 23 is a reply communication to the first portable communication device 20 from which a short message service communication 28 is received. As illustrated in FIG. 2, that third communication 23 is generated based on the number 21, of the short message service communication 28, i.e., the order in which the short message service communication 28 is received. Third communications 24, 25, 26 and 27 are preferably each unique to the portable communication devices 20, and are each generated based on the order in which each of those short message service communications 28 are received as illustrated in FIG. 2.

Figure 3:
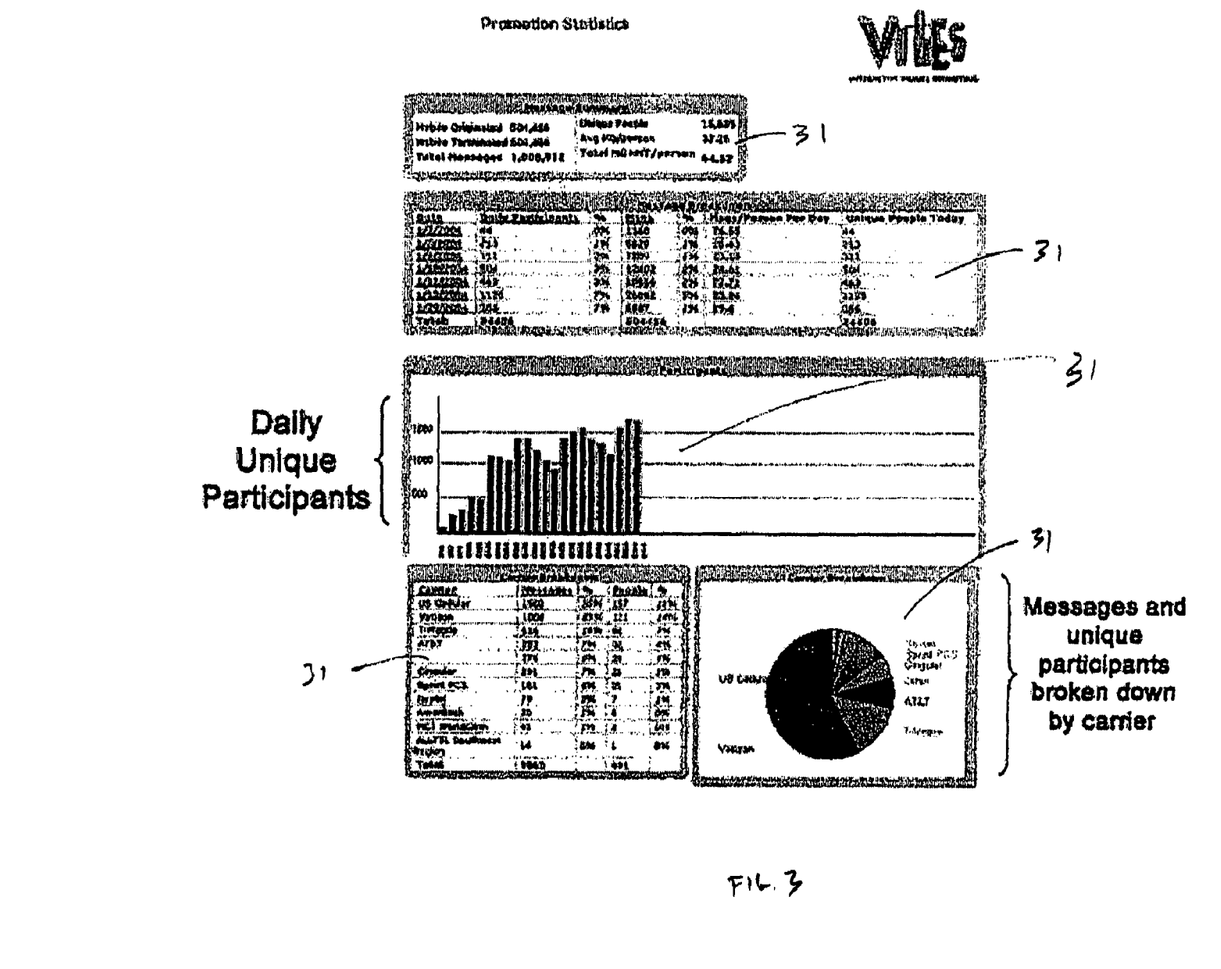
FIG. 3 is an illustration of statistical information representing aggregate data generated by a system configured in accordance with the principles of the present invention.

Referring now to FIG. 3, the system of the present invention can be further configured to generate statistical data 31 relating to the short message service communications received by the server 22. This statistical data 31 can be configured to represent aggregate data regarding the short message service communications, such as the number of short message service communications received at particular hours of the day, or in response to particular personnel operators (i.e., on-air personalities) of the central broadcast station 10.

Figure 5:
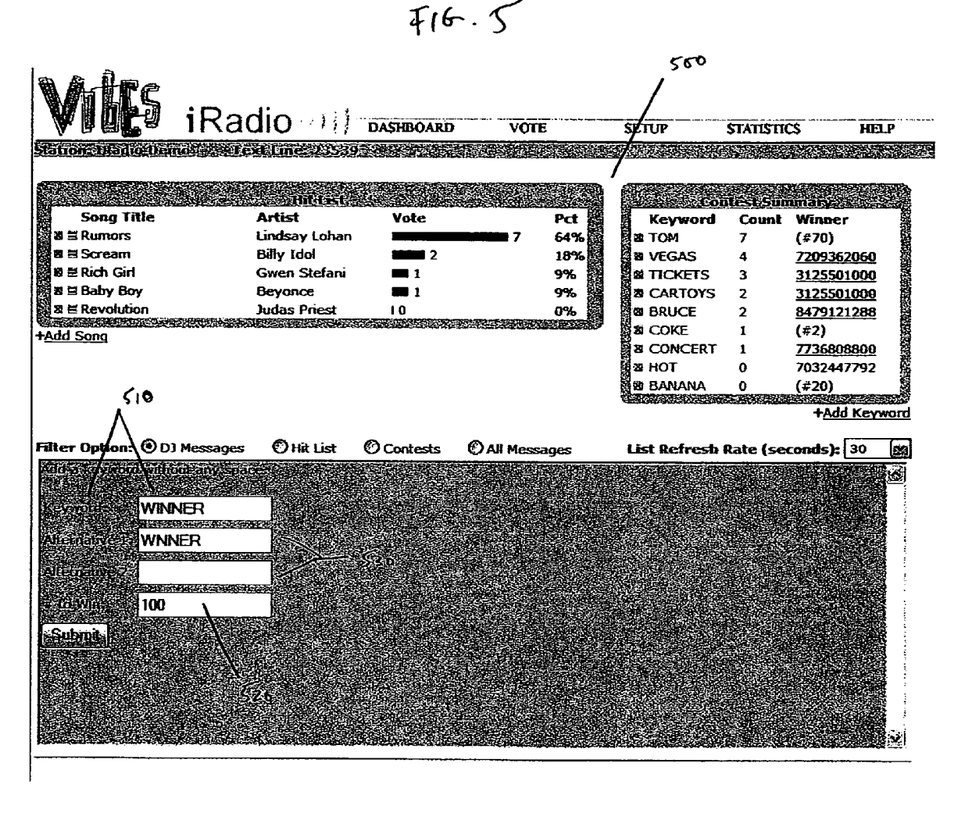

Referring to FIG. 5, a graphical user interface 500 is illustrated for use in the present system. The graphical user interface 500 is designed for use by the party transmitting the first broadcast communication, i.e., a user at a radio station. As illustrated in FIG. 5, the radio station user can specify the parameter 510, or "keyword" that audience members must include in their short message communications. The radio station user may also specify the order number 520 of the audience member who is going to win the contest; in the example shown in FIG. 5, the hundredth audience member to reply with the alphanumeric string "WINNER" in a short message communication will win the contest. Also as illustrated in FIG. 5, the radio station user may specify alternative alphanumeric strings 530 that will be accepted by the system; in the illustrated example, the radio station user has specified that the string "WNNER" will be accepted as a typographical error intended to be the string "WINNER". It will be understood that FIG. 5 is merely an exemplary illustration of a graphical user interface for performing that function, and that additional graphical user interfaces can be used without departing from the principles of the present invention. It will further be understood that though the graphical user interface illustrated in FIG. 5 allows for two the entry of two alternative strings 530 that will be accepted as the "keyword" string, any number of alternative strings 530 can be specified.

Figure 6:
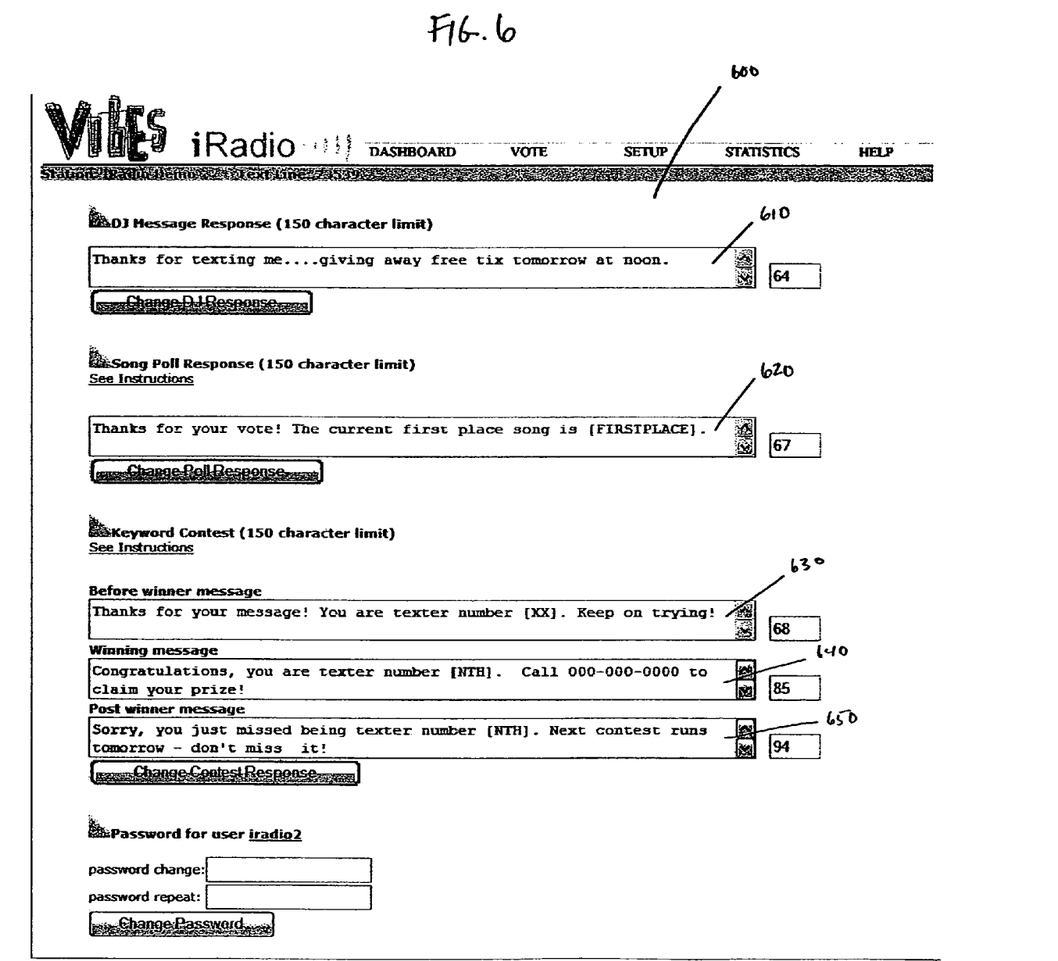

Referring to FIG. 6, a graphical user interface 600 is illustrated for use in a system embodying the principles of the present invention. The party transmitting the first communication, e.g. a user at a radio station, can specify third communications 610, 620, 630, 640, 650 that will be sent automatically to audience members who transmit short message communications to the radio station. Moreover, the contents of the third communications 610, 620, 630, 640, 650 can be predetermined by a radio station user and based on the contents of the short message communication received by an audience member and/or the order in which that short message communication is received. For example and as illustrated, the radio station user can specify a message 610 such as "Thanks for texting me . . . giving away free tix tomorrow at noon", which will be transmitted to audience members who transmit a short message communication to the radio station when a contest is not in progress. The radio station can also, as illustrated, specify a third communication 620, such as "Thanks for your vote! The current first place song is [FIRSTPLACE]", which will be transmitted in response to audience members to submit short message communications containing votes for their favorite song or artist. The system is configured to automatically replace the string "[FIRSTPLACE]" with the song or artist that has the current highest number of votes from audience members. Also and as illustrated, the graphical user interface allows the radio station user to specify third communications 630, 640, 650 that will be sent during a contest. The third communications 630, 640, 650 transmitted to an audience member can be based on the order in which that audience member's short message communication was received. For example, the user can specify the message 640 "Congratulations! You are texter number [NTH] !" to the audience member who is the Nth audience member to reply with the required alphanumeric string in the short message communication. The system is configured to automatically replace the string [NTH] with the order number of the audience member; for example, "$100^{th}$". Likewise, the radio station user can specify that audience members whose order number falls within a certain range of N will receive third communications 630, 650 that differ from the third communications transmitted to audience members whose order number falls outside that predetermined range. For example, audience members with order numbers 1 through 99 can be specified to receive a third communication string 630 of "Thanks for your message! You are texter number [XX]", where the system is configured to automatically replace the string "[XX]" with the order number of that audience member. Audience members with order numbers higher than 100, however, can be specified to receive a different third reply communication 650, such as "Sorry you just missed being texter number [NTH]". Thus, as shown in FIG. 6, the third communication 630, 640, 650 can be based on the order in which the short message communication was received by the system, the time at which the short message communication was received, or the contents of the short message communication.

The system implements computer program or software for configuring the server to perform the functions described. The program includes segments of code for implementing each such function. When the system is implemented in software, it should be noted that the system can be stored on any computer readable medium for use by or in connection with any computer related system or method. The system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As used herein, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium.

More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While this invention is susceptible to embodiments in many different forms, this specification and the accompanying drawing disclose only preferred forms as examples of the invention. The invention is not intended to be limited to the embodiments so described, however. The scope of the invention is identified in the appended claims.

What is claimed is:

1. A system for managing short message service communications transmitted from an audience in response to a first communication transmitted from a radio station comprising:
   a server for receiving a plurality of short message service communications, wherein at least a portion of the plurality of short message service communications is transmitted from a portable communication device comprising a cellular telephone in reply to the first communication initiated by a host at the radio station, the server being configured to identify a parameter of at least a portion of the plurality of short message service communications and generate from at least a portion of the plurality of short message service communications a requested artist or song to be broadcast by the radio station;
   a display operably coupled to the server and mounted within the radio station for automatically displaying at least two of the plurality of short message service communications and the requested artist or song; and,
   wherein, at the radio station, the host can select and personally respond to the displayed short message service communications.

2. The system of claim 1 wherein the server tracks information relating to each of the plurality of short message service communications received.

3. The system of claim 2 further comprising code for generating statistical data based on the plurality of short message service communications received.

4. The system of claim 3 further comprising a code segment for plotting the statistical data on at least a portion of a graphical user interface image.

5. The system of claim 3 wherein the statistical data corresponds to the relative number of the plurality of short message service communications received from each of a plurality of service providers.

6. The system of claim 3 wherein the statistical data corresponds to a relative at least one of a number of unique participants transmitting each of the plurality of responding communications, a number of responding communications received by the computer and relative time interval between receipt of responding communications.

7. The system of claim 3 further comprising a code for updating the statistical data in real time.

8. The system of claim 1 wherein the first communication is a request for participation in a contest, and wherein the server is further configured to automatically determine whether the parameter indicates one of a win and a loss for the contest.

9. The system of claim 1 wherein at least one of the short message service communications received by the server is a text message.

10. The system of claim 1 wherein the server is configured to assign a number to at least one of the plurality of short message service communications received by the server based on the order in which the at least one short message service communication is received by the server.

11. The system of claim 6 wherein the server is configured to transmit a third communication to at least one portable communication device which transmitted a short message service communication to the server in response to the first communication.

12. The system of claim 7 wherein the third communication is generated based on the number assigned to the short message service communication received by the at least one portable communication device.

13. The system of claim 1 wherein a plurality of the short message service communications each comprise a predetermined parameter, the server being configured for tabulating aggregate data from the plurality of short message service communications based on the predetermined parameter.

14. A system for communicating with an audience using a radio transmitter for transmitting a radio broadcast at a predetermined radio frequency to an audience, wherein the radio broadcast includes an invitation to participate in a contest; the system comprising:

a server for receiving a plurality of text messages wherein at least a portion are in response to the radio broadcast and transmitted by a cellular telephone to a predetermined address, wherein the text messages in response to the radio broadcast are is an entry into the contest and assigned a number based on the order in which the text message response was received by the server, and wherein the server is configured for generating a text message reply to each text message response to a corresponding cellular phone from which each text message response was transmitted, the text message reply to each text message response being based upon the number assigned to each text message; and, wherein at least a portion of the plurality of text messages comprising a request for an artist or song that are viewable and selectable by a radio host or disc jockey for responding thereto.

15. The system of claim 14 wherein the server tracks information relating to the text messages in response to the radio broadcast.

16. The system of claim 14 wherein the text message reply indicates one of a win and a loss for the contest.

17. The system of claim 14 wherein at least one of the text message in response to the radio broadcast is a text message.

18. The system of claim 14 further comprising code for generating statistical data based on the text messages in response to the radio broadcast.

19. The system of claim 18 further comprising code for plotting the statistical data on at least a portion of a graphical user interface image.

20. The system of claim 18 wherein the statistical data corresponds to at least one of a number of unique participants to the contest.

\* \* \* \* \*